United States Patent
Bush et al.

(10) Patent No.: US 7,293,785 B2
(45) Date of Patent: Nov. 13, 2007

(54) ROLL CONTAINER

(75) Inventors: Stephen Frederick Bush, Poynton (GB); James Alexander Myers, Ecclesfield (GB)

(73) Assignee: The Rollet Company Limited, Manchester (GB)

( * ) Notice: Subject to any disclaimer, the term of this patent is extended or adjusted under 35 U.S.C. 154(b) by 64 days.

(21) Appl. No.: 10/548,494

(22) PCT Filed: Mar. 9, 2004

(86) PCT No.: PCT/GB2004/000989

§ 371 (c)(1),
(2), (4) Date: Oct. 13, 2005

(87) PCT Pub. No.: WO2004/080780

PCT Pub. Date: Sep. 23, 2004

(65) Prior Publication Data

US 2006/0175804 A1    Aug. 10, 2006

(30) Foreign Application Priority Data

Mar. 10, 2003    (GB) ................................. 0305404.6

(51) Int. Cl.
*B62B 1/00* (2006.01)
(52) U.S. Cl. .............................. 280/47.34; 280/47.35; 280/79.3
(58) Field of Classification Search ............. 280/47.34, 280/47.35, 79.3, 79.7, 651, 770; 211/186; 312/297, 257.1, 328, 350, 263; 220/4.28, 220/771
See application file for complete search history.

(56) References Cited

U.S. PATENT DOCUMENTS

| 4,456,142 | A |   | 6/1984  | Burling |
|-----------|---|---|---------|---------|
| 4,782,972 | A | * | 11/1988 | Wenkman et al. ......... 220/4.28 |
| 5,048,902 | A |   | 9/1991  | Daly |
| 5,069,466 | A | * | 12/1991 | Propst ....................... 280/79.3 |
| 5,263,701 | A | * | 11/1993 | Kleinhen .................... 220/4.28 |
| 5,360,263 | A | * | 11/1994 | Nakano et al. .......... 312/257.1 |
| 5,566,961 | A | * | 10/1996 | Snell et al. .............. 280/47.35 |
| 5,605,344 | A | * | 2/1997  | Insalaco et al. .......... 280/47.34 |
| 5,816,425 | A |   | 10/1998 | Keip et al. |
| 5,975,660 | A | * | 11/1999 | Tisbo et al. .................. 312/263 |
| 6,113,203 | A |   | 9/2000  | Chen |
| 6,234,498 | B1 | * | 5/2001 | Saku et al. ............... 280/47.34 |
| 6,811,164 | B2 | * | 11/2004 | Trogstam ................... 280/79.3 |

FOREIGN PATENT DOCUMENTS

| DE | 19921627       | 5/1998 |
| DE | 10059256       | 6/2002 |
| EP | 0487147        | 5/1992 |
| EP | 1118523        | 7/2001 |
| EP | 1118524        | 7/2001 |
| FR | 2827262        | 1/2003 |
| GB | 2024735        | 1/1980 |
| WO | WO 2004/050450 | 6/2004 |

* cited by examiner

*Primary Examiner*—Hau Phan
(74) *Attorney, Agent, or Firm*—Woodard, Emhardt, Moriarty, McNett & Henry LLP (57) ABSTRACT

A demountable, modular roll container comprises a plastics base (1) with wheels (13) (or castors) attached and two, three or four side plastics panels (2, 3) which lock into the base (1) with adjacent panels (2, 3) locking into each other. One or more shelves (18) lock into and stabilize the side panels. The whole assembly makes a modular two, three or four-sided container on wheels, with one, two or more compartments.

30 Claims, 7 Drawing Sheets

ROLL CONTAINER

This invention relates to roll containers.

Roll-cage pallets made from metal wire mesh are a common sight in warehouses, cold stores, wholesale and retail stores for the carrying and transport of a wide variety of both consumer and industrial products. Roll-cage pallets are often stacked with goods, then loaded on to container lorries or vans, then unloaded at their destination. After the goods are unloaded, the empty roll-cage pallets are loaded back into the container, lorries or vans and returned to the points whence they came. While many roll-cage designs provide for a degree of nesting, there is a good deal of valuable wasted space in container lorries or vans when the roll-cages make their homeward journeys.

In addition to this obvious disadvantage, roll-cage pallets are often too heavy for one person to lift them into and out of lorries or vans, their wire cages are prone to bending damage, which affects their stability in use and they cause common injuries to feet and ankles, particularly when being manoeuvred up tail-boards, slopes and ramps. The wire cages commonly rust at the points where the wires meet to form the cage, these points providing crannies where general dirt, bacteria and viruses may lodge. This makes cleaning difficult, if not impossible, to the standards required in food stores, hospitals, pharmaceutical stores and factories.

It is an objective of the present invention to provide an alternative to roll-cage pallets, which eliminates or substantially mitigates all these problems.

According to the present invention, there is provided a demountable, modular roll container suitable for use in food stores, cold stores, hospital and other clean environments, and for use wherever goods have to be moved from one point to another, consisting of a plastic base with wheels or castors attached, two, three or four side plastic panels which lock into the base and into each other and one or more shelves which lock into the side panels stabilizing them, the whole assembly making a modular two, three or four-sided container on wheels, with one, two or more compartments.

The invention provides a demountable modular roll container, to replace existing wire mesh containers, consisting of a base, sides and shelves fabricated entirely from plastics materials, of modular construction such that any of two, three or four side panels and one or more shelves may be used wherein the side panels lock into the base and where adjacent side panels lock into each other and the shelves lock into the side panels providing one, two or more compartments, and where castors or wheels are attached to the base to provide motion.

The whole roll container is readily assemblable and demountable in its various forms by one person. In the demounted state, the parts may be packed in compact form for dispatch and subsequent assembly by customers, or when being returned to depot or warehouse or the like when in use.

The base, sides and shelves of the roll container are fabricated entirely from plastic material. Only the wheels or castors and possibly small clips may be fabricated from metal.

The modular roll container may comprise two opposed channels between which at least one shelf is supported. The modular roll container may comprise two adjacent side panels (one of which may for example be classed as a front or rear panel) that are locked together and which support at least one shelf. Alternatively the modular roll container may comprise two opposed panels and at least one further panel locked to and extending between the said two opposed panels. The modular roll container may thus comprise said two side panels and two of said further panels each locked to said two side panels.

The base of the modular roll container may be rectangular (e.g. square) in horizontal section.

The side panels may be provided along their basal edges with a plurality of spaced lugs and the upper surface of the base may be provided along each marginal region with a plurality of apertures for receiving the lugs of the side panels whereby the side panels are locked into the base. The lugs of at least some of the panels may be arcuate and permit the side panel to be pivotably raised from a lowered position at which the lugs are inserted into the apertures of the base to a secured vertical position.

The base may be provided on its undersurface with a plurality of recesses in each of which a said wheel or castor is mounted to be located partly in the recess and partly to project therefrom. These recesses may be provided in the regions of the corners of a rectangular cross-sectioned base of the modular roll container. The upper surface of the base may be provided with recesses into which the castors or other forms of wheel or another base may be located such that the bases may be stacked for transport when roll containers are in their demounted state.

Locking of adjacent first and second side panels together may be by means of co-operating male and female locking formations provided on the adjacent side edges of the first and second panels respectively. The male locking formations may be insertable laterally and then downwardly into the female formations to effect reversible locking of the first and second panels together, which operation need only require one person.

The female locking formations may each comprise an upper recess that is open at the inner and outer faces and at the side edge of the first panel and a lower retaining cavity that is closed at the outer face and side edge of the first panel. The male locking formations may each comprise a head with a depending lug which locates in said cavity of the female locking formations.

Each shelf of the modular roll container may be supported by a pair of opposed side panels of the container such that two opposed side panels when locked into the base are secured in a vertical position.

Each shelf may be supported by the opposed side panels by a tongue and groove arrangement. Thus each of two opposed side panels may be formed with at least one horizontal groove at the same horizontal level as a corresponding groove in the other panel and the shelf is provided with a tongue along each of two opposed side edges for location in the grooves of the opposed side panels. This tongue may be provided with an upstanding rib which effects locking into the groove of the side panel.

In an alternative arrangement, the shelves have protruding lugs which locate in windows or handholds of opposed side panels to support the shelves and stabilize said opposed side panels in a vertical position.

Preferably the base incorporates two recesses in to which may be inserted bars which lock onto part of the recesses for towing one or more of the containers joined together.

Preferably also the base, side panels, and shelves are formed with an absence of crevices and sharp edges to facilitate cleaning by hand or steam jet and to reduce or eliminate the chance of injury to fingers and ankles when two containers approach each other and to reduce or eliminate the chance of harbouring dirt, bacteria and viruses.

It is preferred that the base projects horizontally beyond the side panels in a smooth contour to further protect ankles from injury.

It is preferred that the side panels are formed with windows, some of which may be shaped and positioned to act as handholds at convenient heights for moving the roll containers in any direction without risk of injury to fingers, as well as providing a view of the contents when four panels are in place. Where in this case the roll container is to be used for the transport of frozen or chilled products, it is provided that the window spaces are filled with transparent plastic material and a shelf positioned near the top of the panels providing an enclosed space which may contain a small refrigerating unit.

Preferably the base is formed with channels leading to one or more holes passing from its upper surface to exits underneath to facilitate run off from cleaning and condensation.

Preferably the underside of the base is provided with recesses into which castors or other forms of wheels may be inserted securely but easily removable for cleaning and replacement.

The invention may be provided in a range of physical sizes from household size for the transport of domestic shopping to roll-cage pallet size and above.

Preferably the base, shelves and panels are formed by moulding processes using materials such as polyethylene, polypropylene, nylon and polycarbonate, although thermosetting materials such as polyurethane and polyester can be used. Fibre reinforcements may be used to provide additional bending stiffness. Anti bacterial agents, fire retardant additives, uv stabilizers colorants may also be included in the moulding materials.

Moulding processes which may be used to shape the base include rotational moulding, injection moulding, and thermoforming. The shelves and panels may be formed by these processes and by compression moulding depending on the material used. The preferred method of production for small to medium scales of production is rotational moulding for the base and panels. Rotational moulding may be used for the shelves also. Injection moulding and thermoforming may also be used at larger scales of production for one or more of the base, panels and shelves depending on the demand for different varieties of the product.

Other things being equal, the hollow walls of the rotationally moulded panels and shelves provide the highest stiffness to weight ratio of any process and are, therefore, particularly suitable for the application where above a certain minimum weight, light weight is an important advantage.

Opposed panels of the modular roll container may be symmetric about a vertical axis through their centers. With such an arrangement, only two moulds are needed for producing four panels thereby effecting a substantial saving on production costs.

The hollow walls of the rotomoulded panels may be filled with a suitable foam increasing their insulation value in the cold box application of the invention. Such foam may also improve panel and shelf stiffness and impact resistance of the base.

The invention will be further described by way of example only with reference to the accompanying drawings, in which:

FIGS. 10(a)-(c) show successive steps in locating a panel of the first type shown in FIG. 4 onto the base shown in FIG. 8;

Figure 1:
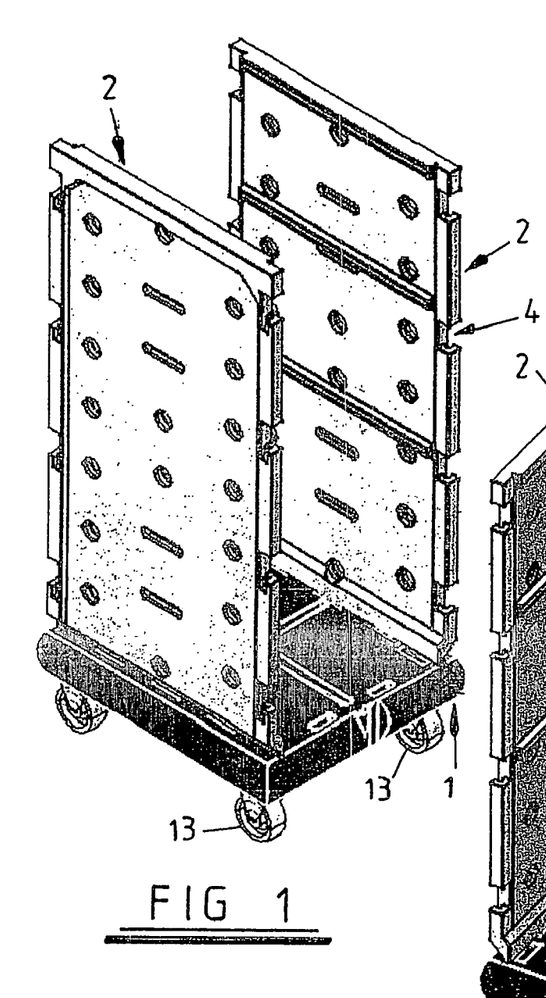
FIG. 1 is a perspective view of a partially assembled modular roll container showing a base and two opposed side panels, each of a first type.
Figure 2:
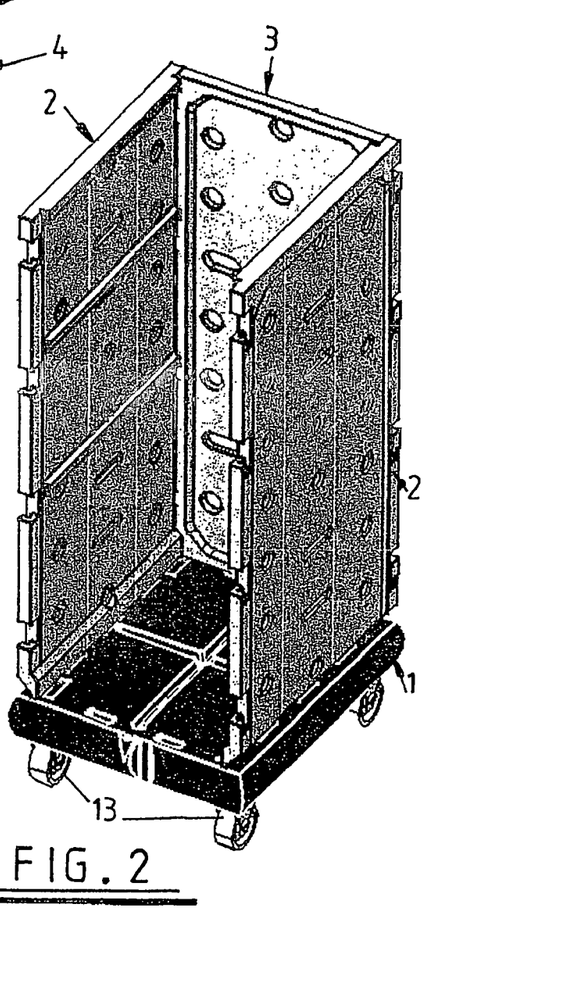
FIG. 2 is similar to FIG. 1 but shows an additional panel of a second type.
Figure 3:
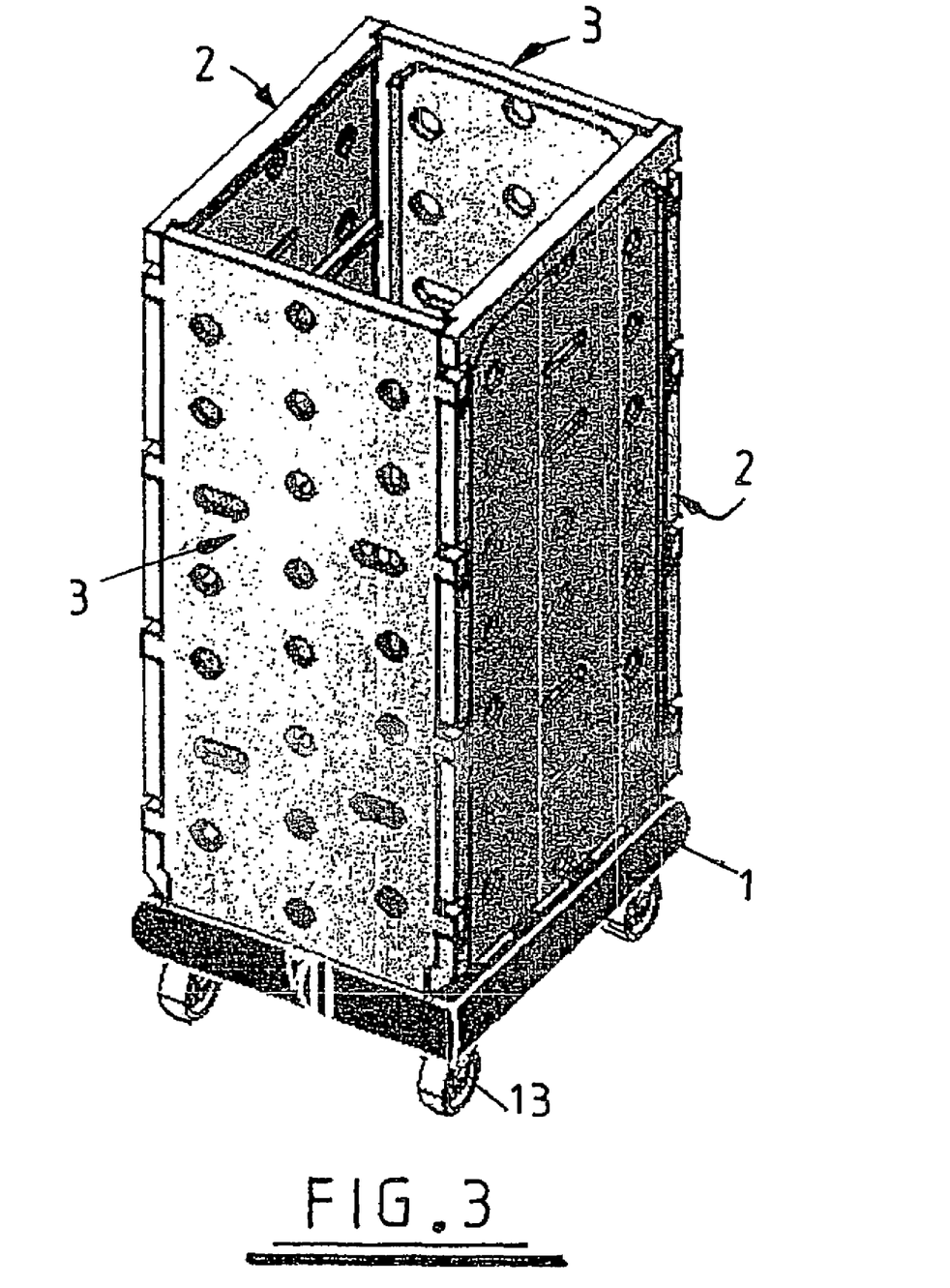
FIG. 3 is similar to FIG. 2 but shows two panels of the second type.

The partially assembled modular roll container shown in FIG. 1 comprises a wheeled base 1 and two opposed side panels 2 of a first type. FIGS. 2 and 3 show a partially erected form of the roll container with respectively one and two additional side panels 3 of a second type.

Facing panels 2, and 3 are each symmetric about a vertical axis through their centres. This means that only two moulds are needed for the four panels thus saving on production costs.

Figure 4:
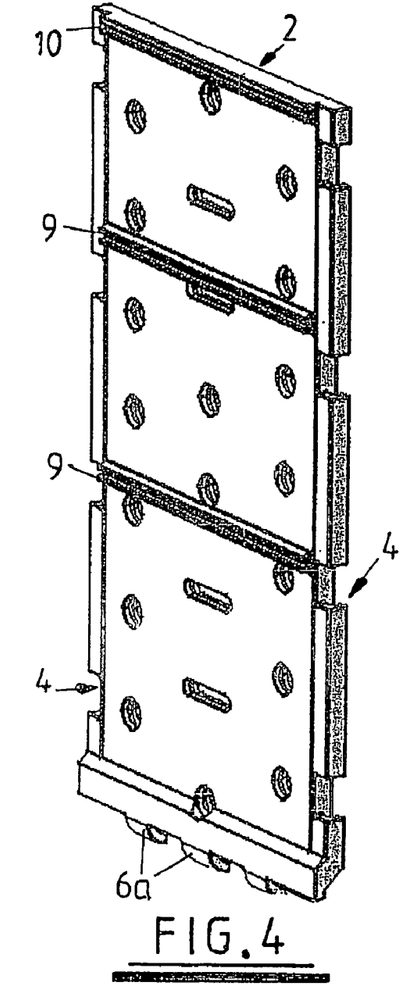
FIG. 4 is a perspective view from one side of the first type of panel shown in FIG. 1.
Figure 5:
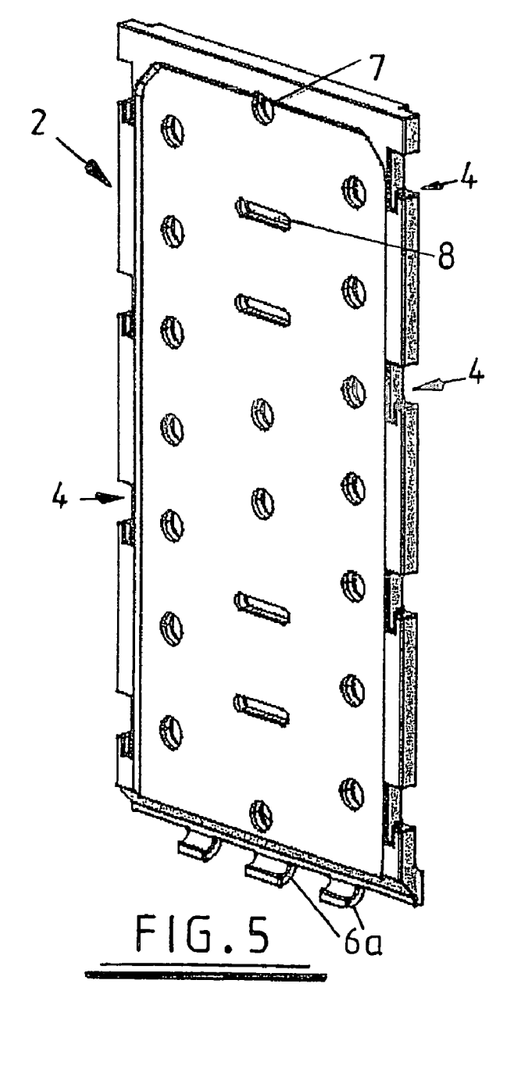
FIG. 5 is a perspective view of the panel shown in FIG. 4 but from the opposite side.
Figures 11, 12, 13, 14:
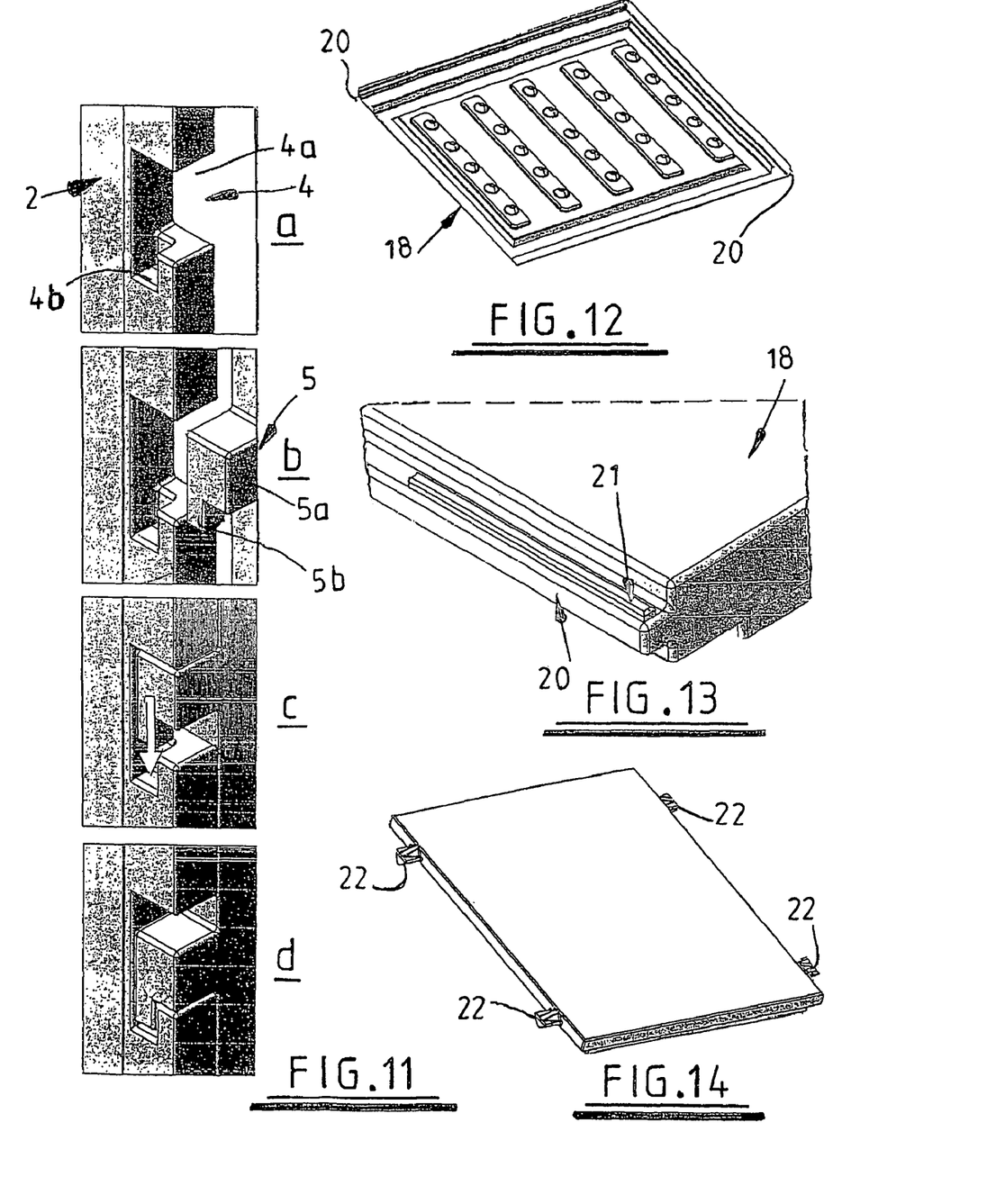
FIG. 11 shows successive steps in locating and locking a panel of the second type shown in FIG. 6 into position on a panel of the first type.
FIG. 12 is a perspective view of one embodiment of shelf for inclusion in the modular roll container.
FIG. 13 is a detail of the shelf of FIG. 12.
FIG. 14 is a perspective view of a further embodiment of shelf.

As shown in FIGS. 4 and 5, side panels 2 are provided with a plurality of female locking formations 4 each of which comprise an upper slot (or recess) 4a that is open at the inner and outer faces of the panel 2 and at the side edge thereof, and a lower retaining cavity 4b that is closed at the outer face and side edge of the panel (see also FIG. 11).

Provided along the lower edges of panels 2 are three spaced arcuate lugs 6a. Additionally provided on panels 2 are ribs 9 at a lower and intermediate height respectively and an upper rib 10, the ribs 9 and 10 serving to locate shelves in position.

FIG. 4 illustrates the design for two ribs 9 plus a rib 10 for location of a shelf 18 at the top of side panels 2 for use either (a) when the four-sided variant (FIG. 3) is required to be totally enclosed, or, (b) when the sides of the two-sided variant (FIG. 1) are required to be prevented from rocking too far from the vertical position.

Figure 6:
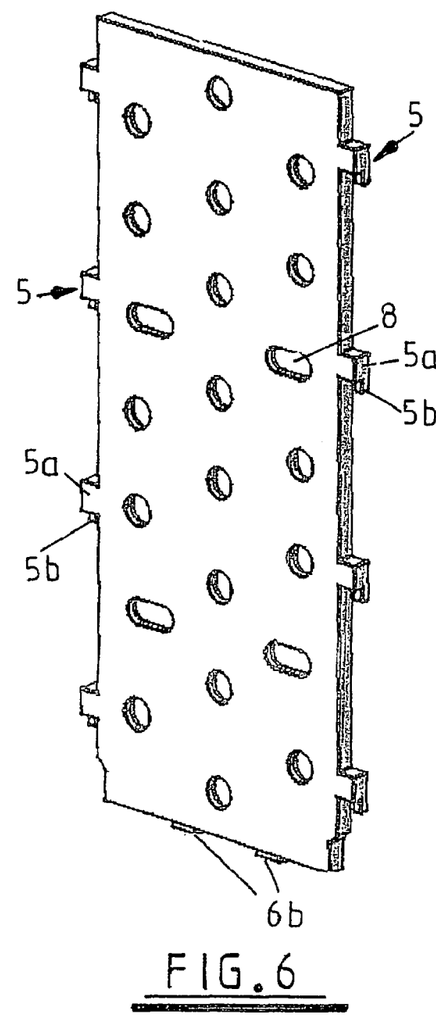
FIG. 6 is a perspective view from one side of the second type of panel shown in FIG. 2.
Figure 7:
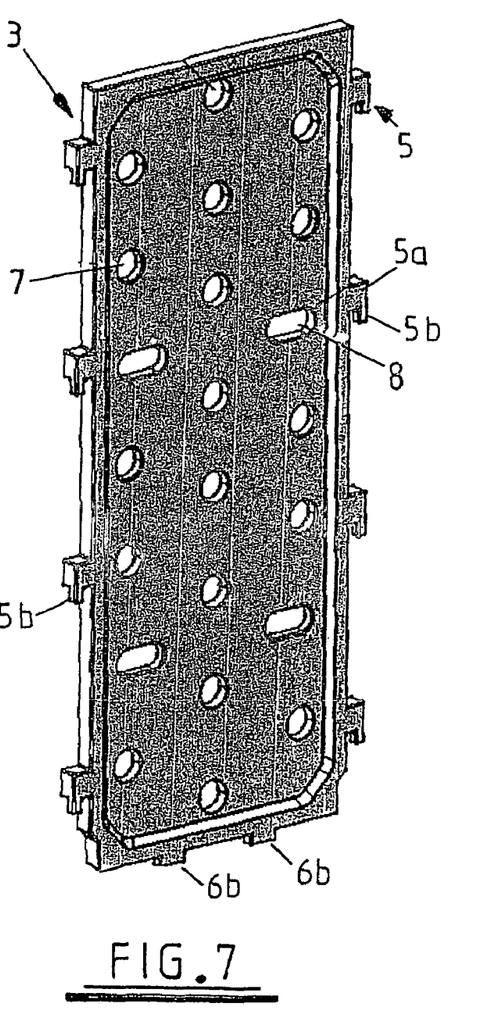
FIG. 7 is a perspective view of the panel shown in FIG. 4 but from the opposite side.

As shown in FIGS. 6 and 7, side panels 3 are each provided along their side edges with vertically spaced male locking formations 5 each comprised of a head 5a and a depending prong or lug 5b. These locking formations 5 are dimensioned so as to be insertable laterally and then downwardly into the female locking formations 4 (of panel 2) so that prong 5b locates in cavity 4b.

Panels 3 are provided along their lower edges with locating lugs 6b which may be arcuate or planar.

Also shown for the panels illustrated in FIGS. 4-7 are windows 7 and handholds/windows 8, the latter preferably spaced so that they correspond to positions convenient for holding the panels during assembly of the roll container, as well as providing comfortable handholds when moving the roll container.

Figure 8:
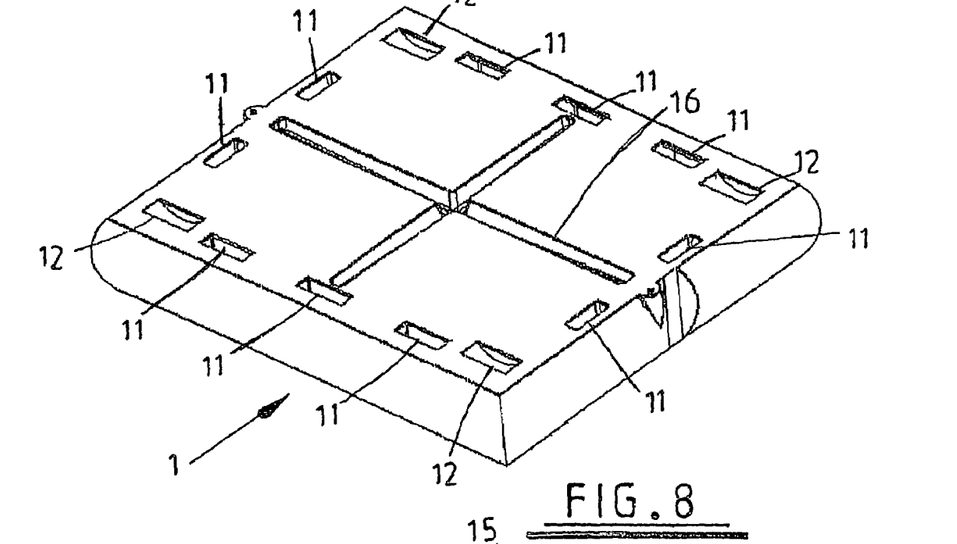
FIG. 8 is a perspective view from above of the base of the partially assembled modular roll container of FIG. 1.

FIG. 8 is a perspective view of the top of the base 1. Slots 11 receive the lugs 6a and 6b on the panels (FIGS. 4-7). Grooves 12 receive the wheels 13 (FIGS. 1 to 3) of bases stacked one on top of the other for convenient storage. FIG. 8 also shows runnels 16 to assist run-off of condensation, spillages and cleaning media.

Figure 9:
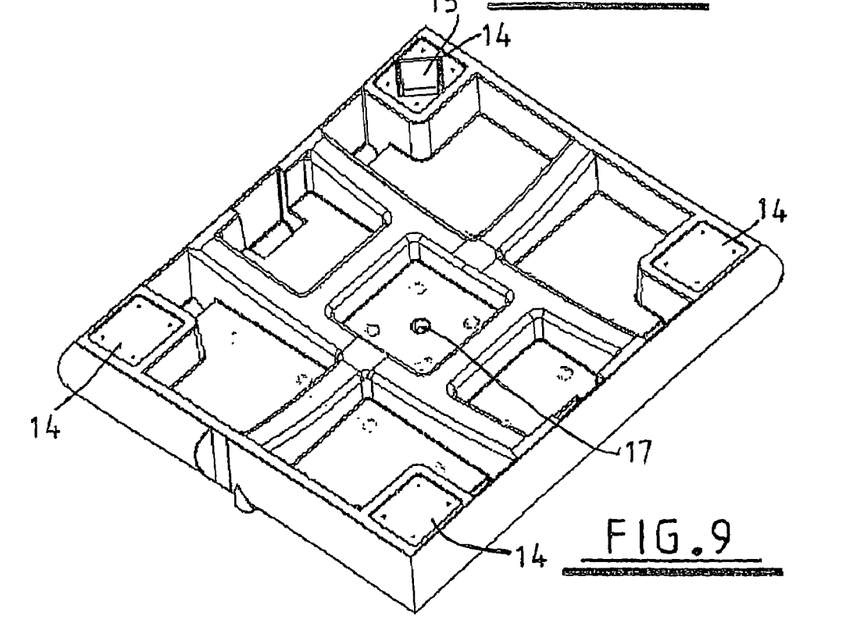
FIG. 9 is a perspective view from the underside of the base shown in FIG. 8.

FIG. 9 is a perspective view of the underside of a base as a further illustration of the different features of the invention. Recesses 14 are designed to allow fixing plates to be attached for the wheels 13. These recesses conveniently provide room for a recess 15 to take a concealed electrical circuit or transmitter which can respond to an incident electromagnetic wave approaching from the upper side of the plastic base, thus providing an individual identifier for the base of each roll container. When combined with bar-coded goods, this provides an electronic record of goods taken from store or delivered to stores by particular roll containers. 17 on FIG. 9 shows the outlet for the runnels 16 on the top face of the base (FIG. 8).

Figure 10:
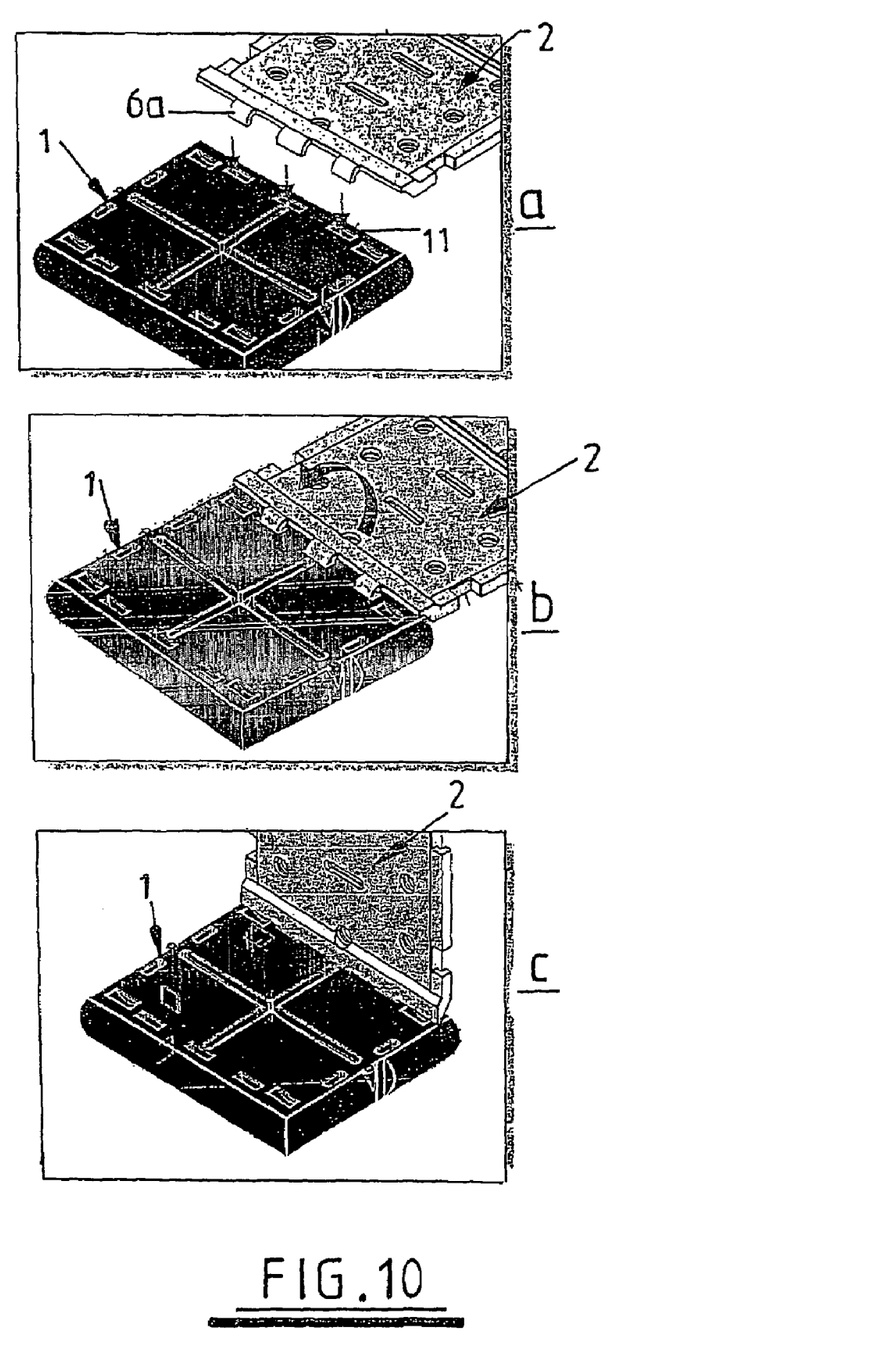

FIG. 10 illustrates the first steps in the assembly of a roll container designed in accordance with the invention. The side panels 2 are first (a) offered to the base 1, (b) the lugs 6a mated with the slots 11 in the base, (c) then the panel 2 is rotated to be at right angles to the base 1. This is repeated for the facing side panels so that the configuration in FIG. 1 is obtained. One or more shelves may now be introduced so that the side panels are maintained in a vertical position.

FIGS. 11(a) to (d) show the sequence involved in locking two adjacent panels 2 and 3 together. In FIG. 11(a), reference numeral 4a is the female locking formation on a side panel 2 with its associated recess 4a and cavity 4b. In FIG. 11(b), reference numeral 5 is a male locking formation on a side panel 3 with its associated head 5a and prong 5b. As shown in FIG. 11(b) the male locking formation 5 is inserted laterally into the recess 4a. FIGS. 11(c) and (d) show the final stages of locking the side and front/back panels together in which the panel 3 is lowered relative to panel 2 so that the prong 5b of the male locking formation (of panel 3) locates in the cavity 4b of the female locking formation 4 (of panel 2). It will be appreciated that this particular locking mechanism allows the panels to be moulded without side cores in their moulds thus considerably economising on the cost of moulds and reducing the moulding cycle times. Demounting (disassembly) is the reverse of the assembly sequences in FIGS. 10 and 11.

Shelves 18 have a dual function, to compartmentalise the roll container and to stabilize the side panels during assembly and in the two-panel variant (FIG. 1) during use.

FIG. 12 shows the underside of a shelf suitable for rotomoulding with a rim 20 which is inserted into the shelf ribs 9, 10, on the side panels (FIG. 4).

FIG. 13 shows a ridge 21 on rim 20 on two sides of the shelf which engages with a matching slot on the shelf ribs 9, 10 of two side panels 2 stopping them from moving apart.

FIG. 14 shows an alternative arrangement in which lugs 22 engage with the windows 7 or windows/handholds 8 (FIGS. 4-7) to stop such sideways movement. This design cannot however be used when the windows and hand-holds are blocked in when the cold box variant is in use.

By its modular, demountable, virtually all plastic construction, this invention offers an economic, hygienic, safe-to-use, adaptable, lightweight but stable alternative to the ubiquitous wire roll-cage trolley and pallets.

The invention claimed is:

1. A demountable, modular roll container comprising a plastics base with wheels or castors attached, two, three or four side plastics panels which lock into the base with adjacent panels locking into each other and one or more shelves which lock into the side panels stabilizing them, the whole assembly making a modular two, three or four-sided container on wheels, with one, two or more compartments;
   wherein the base is rectangular in horizontal section;
   wherein the side panels are provided along their basal edges with a plurality of spaced lugs and the upper surface of the base is provided along each marginal region with a plurality of apertures for receiving the lugs of the side panels whereby the side panels are locked into the base; and
   wherein the lugs are arcuate and permit the side panel to be pivotally raised from a lowered position at which the lugs are inserted into the apertures of the base to a secured vertical position.

2. A modular roll container as claimed in claim 1 wherein the base is provided on its undersurface with a plurality of recesses in each of which a said wheel or castor is mounted to be located partly in the recess and partly to project therefrom.

3. A modular roll container as claimed in claim 2 wherein the recesses are provided in the regions of the corners of the rectangular cross-sectioned base.

4. A modular roll container as claimed in claim 1 wherein each shelf is supported by a pair of opposed side panels of the container such that two opposed side panels when locked into the base are secured in a vertical position.

5. A modular roll container as claimed in claim 4 wherein each shelf is supported by the opposed side panels by a tongue and groove arrangement.

6. A modular roll container as claimed in claim 5 wherein each of the opposed side panels is formed with at least one horizontal groove at the same horizontal level as a corresponding groove in the other panel, and the shelf is provided with a tongue along each of two opposed side edges for location in the grooves of the opposed side panels.

7. A modular roll container as claimed in claim 6 wherein each tongue is provided with an upstanding rib which effects locking into the groove of the side panel.

8. A modular roll container as claimed in claim 1 wherein the shelves have protruding lugs which locate in windows or handholds of opposed side panels to support the shelves and stabilise said opposed side panels in a vertical position.

9. A modular roll container as claimed in claim 1 wherein the base incorporates two recesses in to which may be inserted bars which lock onto part of the recesses for towing one or more of the containers joined together.

10. A modular roll container as claimed in claim 1 wherein the base, side panels, and shelves are formed with an absence of crevices and sharp edges.

11. A modular roll container as claimed in claim 1 wherein the base projects horizontally beyond the side panels in a smooth contour to further protect ankles from injury.

12. A modular roll container as claimed in claim 1 wherein the side panels are formed with windows.

13. A modular roll container as claimed in claim 12 wherein some of the windows are shaped and positioned to act as handholds.

14. A modular roll container as claimed in claim 12 wherein the windows are glazed with a transparent plastics material, four side panels are used and a shelf is provided near the top of the roll container, the assembly providing a demountable enclosed space.

15. A modular roll container as claimed in claim 14 wherein the enclosed space is provided with a refrigerating unit.

16. A modular roll container as claimed in claim 1 wherein the base is formed with channels leading to one or more holes passing from its upper surface to exits underneath to facilitate run off from cleaning and condensation.

17. A modular roll container as claimed in claim 1 wherein the underside of the base is provided with recesses into which castors or other forms of wheels are inserted securely but easily removable for cleaning and replacement.

18. A modular roll container as claimed in claim 1 wherein the upper surface of the base is provided with recesses into which the castors or other forms of wheel or another base may be located such that the bases may be stacked for transport when roll containers are in their demounted state.

19. A modular roll container as claimed in claim 1 wherein the base, shelves and panels are formed by moulding processes.

20. A modular roll container as claimed in claim 19 wherein the base shelves and panels are formed of polyethylene, polypropylene, nylon or polycarbonate.

21. A modular roll container as claimed in claim 19 wherein the base is formed by rotational moulding, injection moulding or thermoforming.

22. A modular roll container as claimed in claim 19 wherein the shelves and side panels are formed by rotational moulding, injection moulding thermoforming or compression moulding.

23. A modular roll container as claimed in claim 22 wherein the side panels are formed by rotational moulding, are hollow and incorporate a foam.

24. A modular roll container as claimed in claim 1 wherein facing panels are each symmetric about a vertical axis through their centres.

25. A modular roll container as claimed in claim 1 wherein any of the base, shelves and panels are formed from fibre reinforced plastics materials.

26. A modular roll container as claimed in claim 1 wherein the base, shelves and panels contain antibacterial agents.

27. A modular roll container as claimed in claim 1 in which one or more electrical circuits or transmitters are concealed within the plastics base to provide an individual electronic identifier.

28. A kit of parts for assembly into a modular roll container as claimed in claim 1.

29. A demountable, modular roll container comprising a plastics base with wheels or castors attached, two, three or four side plastics panels which lock into the base with adjacent panels locking into each other and one or more shelves which lock into the side panels stabilizing them, the whole assembly making a modular two, three or four-sided container on wheels, with one, two or more compartments;

wherein two adjacent first and second side panels locked together at right angles to each other by co-operating male and female locking formations provided on the adjacent side edges of the first and second panels respectively; and wherein the male locking formations are insertable laterally and then downwardly into the female formations to effect locking of the first and second panels together, this operation being reversible.

30. A modular roll container as claimed in claim 29 wherein (a) the female locking formations each comprise an upper recess that is open at the inner and outer faces and at the side edge of the first panel and a lower retaining cavity that is closed at the outer face and side edge of the first panel, and (b) the male locking formations each comprise a head with a depending lug which locates in said cavity.

* * * * *